(No Model.)

G. W. STAFFORD.
PIN FOR PATTERN CHAINS FOR LOOMS.

No. 407,621. Patented July 23, 1889.

Witnesses
Wm. S. Hague,
Benj. Arnold

Inventor
Geo W Stafford

UNITED STATES PATENT OFFICE.

GEORGE W. STAFFORD, OF PROVIDENCE, RHODE ISLAND, ASSIGNOR TO THE GEO. W. STAFFORD MANUFACTURING COMPANY, OF SAME PLACE.

PIN FOR PATTERN-CHAINS FOR LOOMS.

SPECIFICATION forming part of Letters Patent No. 407,621, dated July 23, 1889.

Application filed May 27, 1889. Serial No. 312,211. (No model.)

*To all whom it may concern:*

Be it known that I, GEORGE W. STAFFORD, of Providence, in the county of Providence and State of Rhode Island, have invented certain new and useful Improvements in Pins for Pattern-Chains for Looms; and I do hereby declare that the following is a full, clear, and exact description thereof, reference being had to the accompanying drawings, and to the letters of reference marked thereon, which form a part of this specification.

This invention relates to the "pattern-pins," so called, which are inserted in the bars of the pattern-chains used in looms, for the purpose of selecting the heddles to be raised by the dobby to produce the pattern on the cloth woven in the loom.

The object is to produce a pin that will hold firmly in the bar without requiring to be driven so hard therein as to be liable to split the wood, of which material the bars are usually made.

The pins mostly in use have a spiral longitudinal ridge on two sides of the part of the pin that enters the bar, and these ridges are mainly depended upon to hold the pin upright in the bar, and are liable to several objections. They have so little bearing against the wood at the sides of the holes in which they are inserted that it is necessary to make them so that they will drive quite hard in their holes—that is, they must be made so much larger than the hole that they are liable to split the bar, especially when driven in the holes, near the end of it. It requires more time to put the pins in the bar where it is necessary to see that the ridges on the pin shall not come across the grain of the wood, to lessen the liability of splitting the bar; but as the pins are changed in position in changing the patterns the creases made by the ridges when the pin was first inserted, supposing the pin was put in the hole with the ridges on it in the direction of the ends of the bar, are apt to render the pins loose if it is inserted a second time in same position, and if the ridges are placed across the bar at the second insertion they are liable to split the bar, the fracture starting in the creases made by the ridges on the pin at its first insertion.

Figure 1:
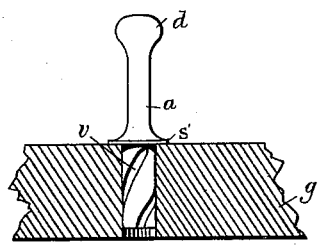
Figure 2:
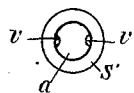
Figure 3:
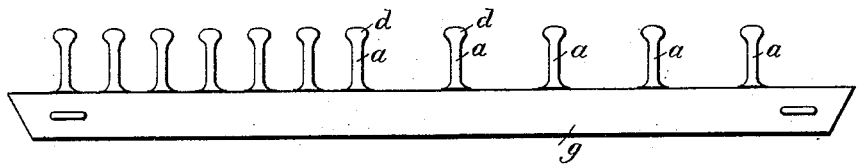
Figure 4:
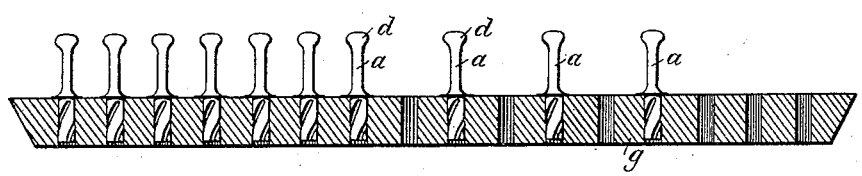

Figure 1 is a longitudinal section of a part of a bar of a pattern-chain, showing the pin in elevation in its place in the bar. Fig. 2 shows an end view of the lower end of the pin. Fig. 3 is an elevation of a bar with pins in it. Fig. 4 is a longitudinal section of a bar with some pins in their places.

The shape of my pin is seen in the elevation of it shown in Fig. 1. Its upper end $d$ is rounded to enable it to pass in under and easily raise the plate-lever by which it operates the proper mechanism. Below the head, at $a$, it is reduced in size to lessen its weight, and is again expanded at $s$ to form a flange or shoulder to give it a good bearing on the face of the bar $g$, and also to determine the height of the pin above the bar.

The lower part of the pin that enters the bar has one or more (preferably two) small grooves $v$ $v$ made longitudinally in its surface. The position and relative sizes of these grooves and the spaces between them are seen in Figs. 1, 2, and 4. By making the diametrical size of these bands or spaces between the grooves $v$ so they will just drive tightly in the holes in the bar a firm support is given to the pin, and a slight entering of the wood into the grooves prevents the pin from turning and thus becoming loose in the bar.

The pins can be used many times over in the holes, because of their broad bearing and the slight alteration made in the size of the holes in which they have been previously inserted; and as it is immaterial which side of a hole the grooves come on much time is saved in setting them.

Having thus described and shown my improved pattern-pin, what I claim as my invention is—

As a new article of manufacture, a pin for pattern-chains for looms, constructed substantially as described—that is, having a portion of the pin for insertion in the bar of a pattern-chain made with one or more longitudinal grooves therein, substantially as shown.

GEO. W. STAFFORD.

Witnesses:
WM. S. HAGUE,
BENJ. ARNOLD.